United States Patent [19]

Kumakura et al.

[11] Patent Number: 4,691,793
[45] Date of Patent: Sep. 8, 1987

[54] APPARATUS FOR DETECTING AMOUNT OF LIQUID NITROGEN

[75] Inventors: Koichi Kumakura; Yoshinori Hosokawa, both of Minami, Japan

[73] Assignee: Horiba, Ltd., Kyoto, Japan

[21] Appl. No.: 809,111

[22] Filed: Dec. 13, 1985

[30] Foreign Application Priority Data

Dec. 13, 1984 [JP] Japan .............................. 59-189233

[51] Int. Cl.$^4$ ...................... G01G 19/52; G01G 3/14; G01G 19/00
[52] U.S. Cl. ................................ 177/50; 177/210 R; 177/245; 177/DIG. 6
[58] Field of Search .............. 177/210 R, DIG. 6, 50, 177/245; 250/231 SE, 211 K

[56] References Cited

U.S. PATENT DOCUMENTS

| | | | |
|---|---|---|---|
| 4,072,201 | 2/1978 | Wiesler | 177/DIG. 6 |
| 4,366,873 | 1/1983 | Levy et al. | 177/DIG. 6 |
| 4,567,467 | 1/1986 | Wiblin et al. | 250/231 SE X |

FOREIGN PATENT DOCUMENTS

| | | | |
|---|---|---|---|
| 52-69345 | 6/1977 | Japan | 250/211 K |
| 53-30312 | 7/1978 | Japan | |

*Primary Examiner*—George H. Miller, Jr.
*Attorney, Agent, or Firm*—Wenderoth, Lind & Ponack

[57] ABSTRACT

An apparatus for detecting an amount of liquid nitrogen, has a table for supporting a Dewar vessel in which liquid nitrogen used for cooling a semiconductor radio detector is contained. A motion conversion mechanism is engaged with the table for converting the movement of the table in the up and down direction in response to changes in the weight of the liquid nitrogen in the vessel and amplifying and movement. The motion conversion mechanism includes a disk rotated by the amplified motion of the table, and a plurality of sensors adjacent the disk for detecting the rotational position of the disk which is representative of the weight of the liquid nitrogen in the vessel.

2 Claims, 4 Drawing Figures

APPARATUS FOR DETECTING AMOUNT OF LIQUID NITROGEN

BACKGROUND OF THE INVENTION

1. Field of the Invention

The present invention relates to an apparatus for detecting the amount of liquid nitrogen present for cooling a semiconductor radio detector.

A semiconductor radio detector is used in a plating composition analyzer and a steel composition discriminator. This detector has a detecting element which is a semiconductor, produced by driving lithium into a silicon substrate. However, this detecting element is sensitive to temperature, and in particular lithium comes out of the silicon substrate at a normal temperature, so that the detector can no longer be used. Therefore, during operation, the detector must always be cooled to the appointed temperature by means of liquid nitrogen housed in a Dewar vessel, as disclosed in Japanese Utility Model Publication No. 30312/1978. Since the semiconductor radio detector is expensive, it is necessary to constantly check the amount of liquid nitrogen present for cooling said semiconductor radio detector, so as to be able to supplement the liquid nitrogen before it is used up.

2. Description of the Prior Art

The prior art uses three types of methods for detecting the liquid nitrogen:

(1) a method of detecting nitrogen within a Dewar vessel by sensing the presence of a radio-isotope; (2) a method of detecting the liquid level by utilizing the reflection of ultrasonic waves of light from the liquid; and (3) a gravimetric detection method utilizing a load cell.

However, the method (1) is unsuitable for a small-sized Dewar vessel used in a semiconductor radio detector, and is expensive, method (2) requires the provision of a detector for detecting the liquid level in the Dewar vessel, and there is the possibility that the detector will be broken due to freezing, and the detector is expensive; and method (3) has the disadvantage that the load cell is not sensitive to a certain definite load and it is expensive.

SUMMARY OF THE INVENTION

The present invention has been achieved to overcome the above described drawbacks, and aims at the provision of an inexpensive apparatus for detecting the amount of liquid nitrogen present so that the amount of liquid nitrogen used for cooling a semiconductor radio detector within a Dewar vessel can be surely detected.

In order to achieve the above described object, the apparatus for detecting the amount of liquid nitrogen according to the present invention has a table for supporting a Dewar vessel in which liquid nitrogen used for cooling a semiconductor radio detector is contained, a motion-conversion mechanism for amplifying and converting the dislocation of the table in the up and down direction and thereby rotating a disk, and a plurality of sensors for detecting the rotation of said disk.

In the above described construction, if the amount of liquid nitrogen within the Dewar vessel, i.e. the weight thereof, is changed, the table is dislocated downward or upward depending on whether there is an increase or a decrease of said amount. The amount of this dislocation is amplified and converted by the motion-conversion mechanism, so that any slight change of the amount can be accurately detected.

BRIEF DESCRIPTION OF THE DRAWINGS

The drawings illustrate one preferred embodiment of the present invention, in which.

DESCRIPTION OF THE PREFERRED EMBODIMENT

One preferred embodiment of the present invention will be described with reference to the drawings.

Figure 1:
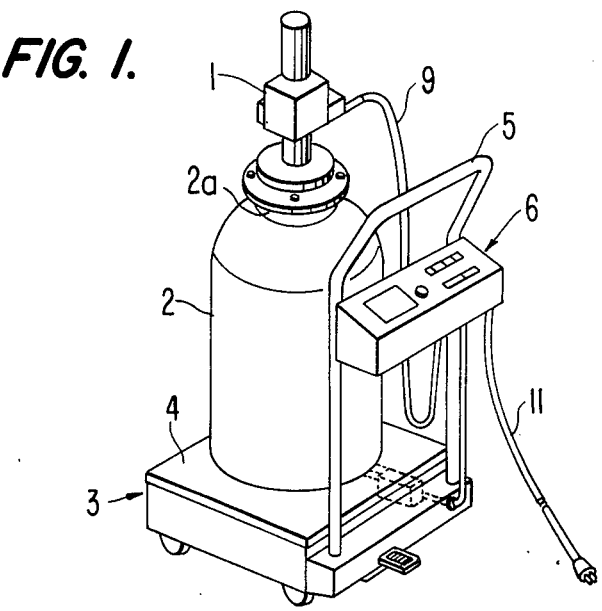
FIG. 1 is a general perspective view of the apparatus according to the invention.
Figure 2:
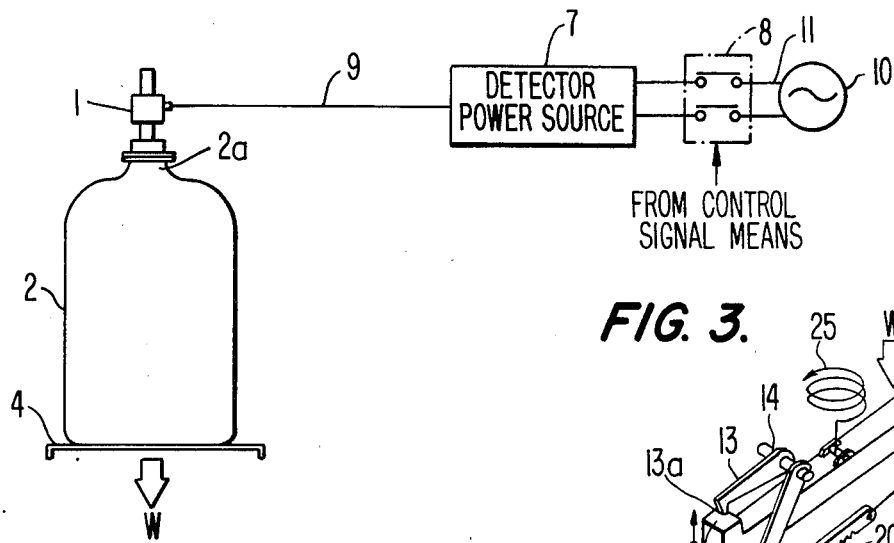
FIG. 2 is a block diagram showing main elements.
Figure 3:
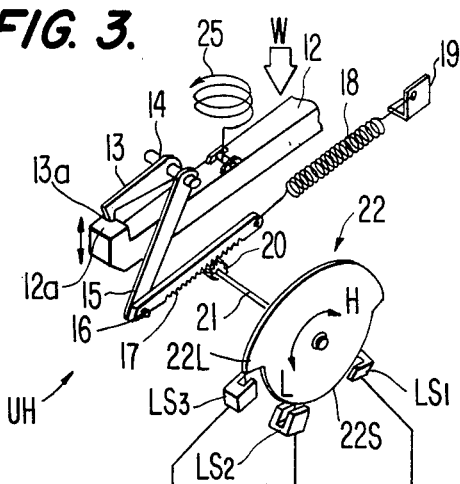
FIG. 3 is a perspective view of the motion conversion mechanism.

Referring now to FIGS. 1–3, 1 designates a semiconductor radio detector (hereinafter referred to as a detector) cooled by liquid nitrogen (hereinafter referred to as LN) through a cooling rod (not shown) disposed above a mouth portion 2a of a Dewar vessel 2 containing LN therein, the cooling rod being inserted into the Dewar vessel 2. 3 designates a wheeled truck provided with a table 4 thereon, said table 4 supporting said Dewar vessel 2 and the detector 1 mounted on the Dewar vessel 2 which is placed thereon. 5 designates a handle on the truck 3 which has a control box 6 mounted thereon. Said control box 6 is provided with a detector power source 7, a switch 8 and the like housed therein. 9 designates a power cable for supplying the detector 1 with electric power, 10 designating an alternating current power source as a primary power source, and 11 designating a connection cable.

Positioned below said table 4 within said truck is a motion-conversion mechanism UH for converting any positional dislocation of said table 4 in the up and down direction into a rotational dislocation and amplifying it and a plurality of sensors $LS_1$ and $LS_3$ for sensing said rotational dislocation.

The construction of these elements will be described with reference to FIG. 3.

12 designates a moveble arm movable in the up and down direction together with the table 4 and which is provided with an operating surface 12a on the upper surface of one end thereof. A load W on said table 4 is due to the weight of the detector 1, the weight of the Dewar vessel 2 and the weight of the LN contained in the Dewar vessel 2. The first two are constants and only the weight of LN is variable. Accordingly, said load W is changed by an increase or decrease of the weight of LN within the Dewar vessel 2.

13 designates a lever fixedly mounted on a pivot 14 at one end thereof and having an engaging portion 13a at the other end operating surface 12a. 15 designates a link fixedly mounted on said pivot 14 at one end thereof and having the other end connected to one end of a rack 17 through a connection pin 16. This link 15 is adapted to operate as a lever together with said lever 13 to transmit the amount of a dislocation of the moveable arm 12 in the up and down direction, that is to say an amount of a dislocation of the table 4 in the up and down direction, to the rack 17 in an amplified manner by setting up the ratio of the length of the link 15 to the length of the lever 13 at a suitable value (for example 10:1). 18 designates a weak tension spring connected between said rack 17 and a fixed anchor 19 for removing the play of the link 15 and the rack 17. 20 designates a pinion engaging with the rack 17 and 21 designates a rotation shaft on which said pinion 20 is mounted. 22 designates a disk fixedly mounted on one end of said rotational shaft 21, having a part of the peripheral edge cut away so as to define a large-diameter portion 22L and a small-diameter portion 22S. A load supporting spring 25 is attached to the arm 12.

The movable arm 12 is dislocated downward together with the table 4 to cause the operating surface 12a to descend until the load W is balanced by the force of a spring 25. The engaging portion 13a of the lever 13 also descends with an increase of the load W on the table 4. If the engaging portion 13a descends 1 mm, and if the amplification coefficient determined by the length of the lever 13 and the length of the link 15 is 10, the rack 17 dislocates rightward by 10 mm. This dislocation is transmitted to the pinion 20 whereby the rotational shaft 21 is rotated clockwise (in the direction of H in FIG. 2). On the contrary, if the amount of LN is reduced, whereby the load W is reduced, the disk 22 is rotated counterclockwise (in the direction of L).

Figure 4:
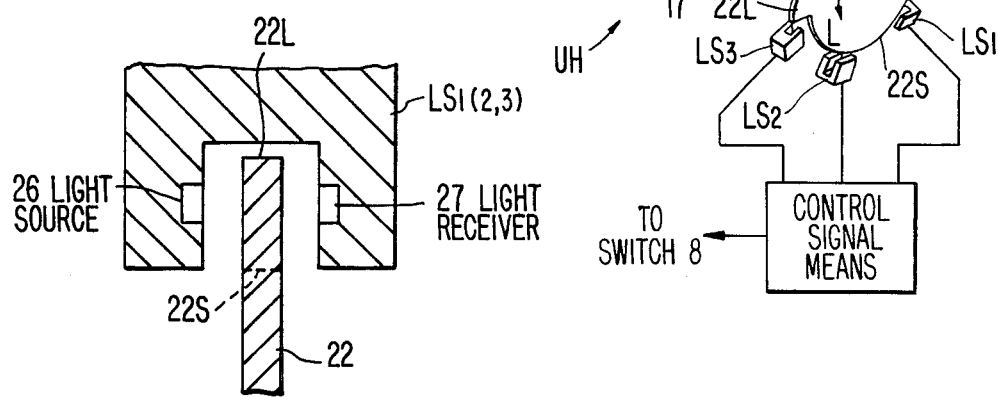
FIG. 4 is an enlarged partial sectional view of a sensor for part of this motion conversion mechanism.

$LS_1$, $LS_2$, and $LS_3$ designate sensors disposed along a circumference of said disk 22. In this preferred embodiment, as shown in FIG. 4, each sensor is provided with a light emitting portion 26 and a light-receiving portion 27. If the large-diameter portion 22L of the disk 22 is between the light emitting portion and the light-receiving portion of one sensor due to rotation of the disk 22, as described above, the light radiated from the light emitting portion is intercepted and said sensor is turned "ON" and puts out a signal "1". On the contrary, if the small-diameter portion 22S is disposed between said two elements, light radiated from the light emitting portion reaches the light-receiving portion without being cut off and the sensor is turned "OFF" and puts out a signal "0". A control signal or the appointed alarm signal can be sent by control signal means to the switch 8 on the basis of the signals put out by these sensors $LS_1$, $LS_2$ and $LS_3$.

The relation between said output signals of the sensors $LS_1$, $LS_2$ and $LS_3$ and the amount of LN within the Dewar vessel 2 can, for example, be set up as follows:

|     | $LS_3$ | $LS_2$ | $LS_1$ | Amount of LN | Switch |
| --- | --- | --- | --- | --- | --- |
| I   | ON  | ON  | ON  | Full | ON |
| II  | OFF | ON  | ON  | Stationery Level | ON |
| III | OFF | OFF | ON  | Supplement Required | ON |
| IV  | OFF | OFF | OFF | Empty | OFF |

In this arrangement, a LN-supplement signal is put out under the condition III and a suitable alarm is generated or displayed. In addition, the detector is broken when LN is used up if an electric charge is loaded on it, so that a control signal will be put out to turn the switch 8 "OFF" when the amount of LN reaches the appointed value or less in order to protect the detector in a positive manner.

Although the motion-conversion mechanism UH comprises the lever 13, the link 15, the rack 17, the pinion 20 and the like in the above described preferred embodiment, the present invention is not limited only to the above described construction. For example, a known crank mechanism converting a linear motion into a circular motion can be used.

In the above described preferred embodiment, the amount of the dislocation of the table 4 is about 1.5 mm when the load W is changed by 50 kg.

As described above in detail, the apparatus for detecting the amount of residual liquid nitrogen according to the present invention is provided with a table for supporting a Dewar vessel in which liquid nitrogen used for cooling a semiconductor radio detector is contained, a motion-conversion mechanism for converting the dislocation of the table in the up and down direction and amplifying it and for to rotating a disk, and a plurality of sensors for detecting the rotation of said disk, so that any slight change of the amount of the dislocation of the table is amplified and detected as an amount of rotation. As a result, the amount of residual liquid nitrogen within the Dewar vessel can be accurately detected. No detector utilizing radio-isotopes, ultrasonic waves or the reflection of light is needed, so that this type of apparatus for detecting can be inexpensive and have a simple construction so that the maintenance can be easily carried out.

We claim:

1. An apparatus for detecting an amount of liquid nitrogen and shutting off power to a semiconductor radio detector when the amount of nitrogen is low, comprising:
   a table for supporting a Dewar vessel in which liquid nitrogen used for cooling a semiconductor radio detector is contained;
   a motion conversion mechanism engaged with said table for converting the movement of the table in the up and down direction in response to changes in the weight of the liquid nitrogen in the vessel and amplifying the movement, said motion conversion mechanism including a disk rotated by the amplified motion of said table;
   a plurality of sensors adjacent said disk for detecting the rotational position of said disk which is representative of the weight of the liquid nitrogen in the vessel;
   a signal controlled switch connected in the power supply for the semiconductor radio detector; and
   control signal means connected between said sensors and said switch for supplying a control signal to turn said switch off when said sensors sense that the weight of liquid nitrogen in said vessel is below a predetermined amount.

2. An apparatus as claimed in claim 1 in which said sensors each include a light emitting part and a light receiving part positioned to receive light from said light emitting part along a path across the peripheral portion of said disk, and in which said disk has a large diameter portion and a small diameter portion around the periphery of said disk, the peripheral portion of said large diameter portion being interposable between said light emitting part and said light receiving part of the respective sensors to block transmission of light and the peripheral part of the small diameter portion being radially inwardly of the path of the light between the parts of said sensors.

* * * * *